Figure 1:
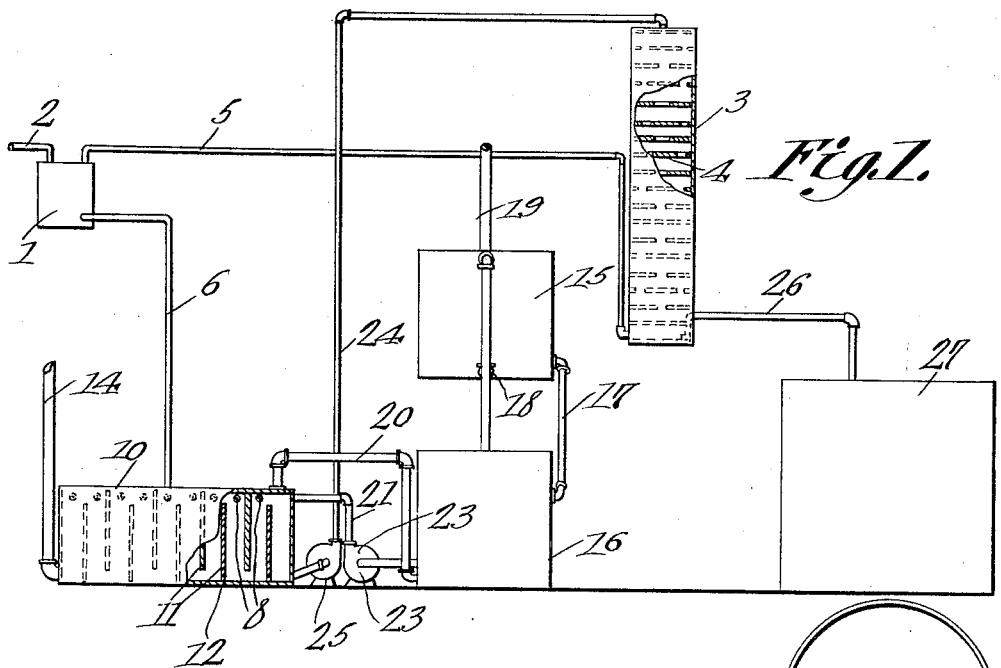

A. F. RICHTER & T. L. DUNBAR.
PROCESS OF MAKING SULFITE LIQUOR.
APPLICATION FILED OCT. 9, 1914.

1,213,415.  Patented Jan. 23, 1917.

A. F. Richter
T. L. Dunbar, Inventors

Witnesses
by
Attorneys

UNITED STATES PATENT OFFICE.

AUGUST F. RICHTER AND THOMAS L. DUNBAR, OF WATERTOWN, NEW YORK.

PROCESS OF MAKING SULFITE LIQUOR.

1,213,415.     Specification of Letters Patent.     Patented Jan. 23, 1917.

Application filed October 9, 1914. Serial No. 865,921.

*To all whom it may concern:*

Be it known that we, AUGUST F. RICHTER and THOMAS L. DUNBAR, citizens of the United States, residing at Watertown, in the county of Jefferson, State of New York, have invented a new and useful Process of Making Sulfite Liquor, of which the following is a specification.

In the sulfite paper pulp process, the practice heretofore has been to deliver the sulfur dioxid gas and spent liquor, received from the digesters during the cooking operation, into the storage tanks. Many previous attempts have been made to carry the liquor back to the $SO_2$ absorption acid-making apparatus and either to mix the liquor with the lime-water or to admit the liquor directly into the $SO_2$ absorption system. This method, however, has failed, due to difficulties produced by foaming.

The present process deviates from former ones as applied to the calcium bisulfite making process, in the distinct feature embodied in mixing the spent liquor from the digesters, after the liquor has been cooled, with a half-made sulfite liquor. The said liquor, carrying an abundance of unconsumed lime, readily combines with the spent liquor from the digesters, and this operation takes place without foaming or other undesirable results. The liquor thus produced is enriched and strengthened markedly by the absorption of sulfur dioxid gas derived from the sulfur burners, the liquor being delivered, in a separate tank and in the form of a spray or mist, into the sulfur dioxid derived from the burners, and in a direction opposed to the flow of gas in the tank.

In order to secure a perfect mixture of the sulfite liquor and the spent liquor from the digesters, these fluids are brought together in a pipe-union or fitting prior to entering the absorption tank, the union or fitting acting as an injector and promoting the mingling of the sulfite liquor and the liquor from the digesters.

To aid in accomplishing the most thorough absorption of the sulfur dioxid gas from the burners by the liquor in the absorption tank, the latter is provided with a series of baffles and the liquid formed by the union of the spent liquor and the sulfite liquor is sprayed between the baffles, thus causing a long and continuous contact between the gas and the liquid. The sulfur dioxid gas which is not absorbed in the tank is returned and combined with calcium bisulfite to produce the sulfite liquor required to keep the apparatus in uniform and continuous operation. From the separator, which receives the gas and liquor from the digester, the salvaged gas is conveyed to an absorption tower and then is mingled with the liquid derived from the absorption tank, the product passing to a suitable storage vessel.

In the accompanying drawing, there is shown diagrammatically, one form of apparatus whereby the process may be carried out.

Figure 3:
Figure 2:
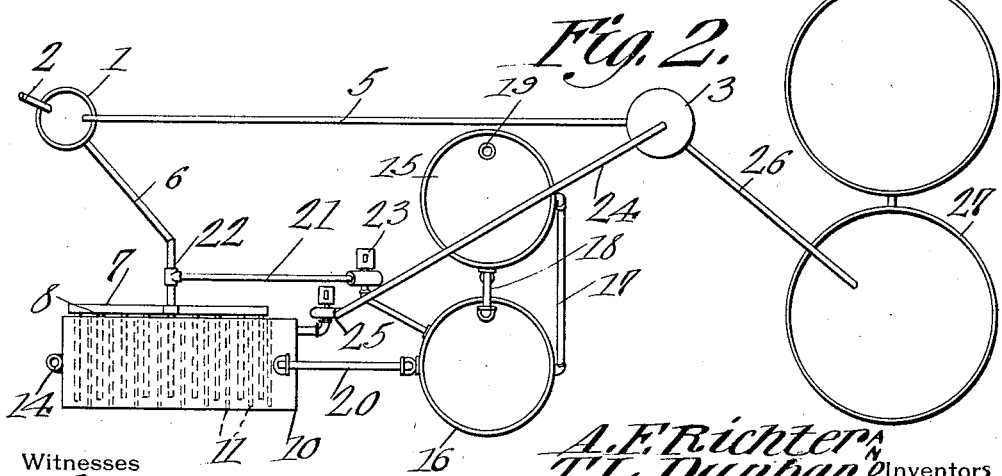

In said drawings, Figure 1 is a side elevation, parts being broken away; Fig. 2 is a top plan; Fig. 3 is a bottom plan of one of the arms of the pipe which discharges into the absorption tank.

In the accompanying drawings, the numeral 1 indicates a separator.

The numeral 2 indicates a pipe whereby the products from a digester are conveyed to the separator 1.

The numeral 3 indicates a sulfur-dioxid absorption tower provided in its interior with baffles 4. The sulfur-dioxid from the separator 1 is conveyed to the bottom of the absorption tower 3 through a pipe 5, the spent liquor from the separator 1 passing therefrom through a pipe 6. The pipe 6 communicates with a manifold 7 having a plurality of arms 8 provided upon their lower faces with perforations 9. The arms 8 enter an absorption tank 10 provided with oppositely extended baffles 11, the arms 8 lying between the baffles. In their lower edges, the baffles 11 are provided with small openings 12 permitting the liquid in the absorption tank to pass through the baffles.

A pipe 14 leads from sulfur burners (not shown) through one end of the absorption tank 10. From the top of the absorption tank 10 a pipe 20 passes to a tank 16, there being a tank 15 provided with a pipe 19 which leads to the exhauster (not shown). The tanks 15 and 16 are connected by pipes 17 and 18. Leading from the tank 16 is a pipe 21 entering a union 22 interposed in the pipe 6. In the pipe 21 is placed a pump 23. A pipe 24 leads from the bottom of the absorption tank 10 to the top of the sulfur dioxid absorption tower 3 and in the pipe 24 is interposed a pump 25. From the tower 3, near the bottom thereof a pipe 26 leads to storage tanks 27.

The products proceeding from the digester (not shown) enter the separator 1 by way of the pipe 2. From the separator 1, the waste liquor passes by way of the pipe 6 toward the absorption tank 10, but before this waste liquor enters the absorption tank, sulfite liquor is mingled with the waste liquor, the sulfite liquor being supplied by the pipe 21. The sulfite liquor carries an abundance of unconsumed lime and combines readily with the spent liquor without foaming and without producing other undesirable results. The union 22 acts to some extent as an injector, and serves to effect a thorough mingling of the sulfite liquor and the spent liquor in the digester. The liquid thus produced passes into the manifold 7 and by way of the arms 8 into the tank 10. Here, the liquid is delivered downwardly in a spray or foam, between the baffles 11 and is discharged downwardly in a direction opposite to that taken by the sulfur dioxid gas introduced into the absorption tank 10 from the burner pipe 14 during the upward travel of the gas between the baffles 11. The excess sulfur dioxid in the tank 10 passes by way of the pipe 20 into the tanks 16—15 and here is mingled with calcium bisulfite to produce the sulfite liquor which, in its turn, is delivered to the pipe 6 by way of the pipe 21. The liquid in the tank 10 passes by way of the pipe 24 into the tower 3 and here is mingled with the sulfur dioxid from separator 1, the pipe 5 serving to convey the sulfur dioxid from the separator to the tower. From the tower 3, the liquid passes by way of the pipe 26 into the tanks 27.

Having thus described the invention, what is claimed as new is:—

A process of making sulfite liquor, which consists in separating the products of a digester into sulfur dioxid and spent liquor; mingling sulfite liquor with the spent liquor; mingling the mixture of sulfite liquor and spent liquor with sulfur dioxid from a burner; mingling the excess sulfur dioxid from the burner with calcium bisulfite to form the said sulfite liquor; and mingling the sulfur dioxid which is abstracted from the products of digester with the compound derived by mingling the spent liquor, the sulfite liquor and the sulfur dioxid from the burner.

In testimony that we claim the foregoing as our own, we have hereto affixed our signatures in the presence of two witnesses.

AUGUST F. RICHTER.
THOS. L. DUNBAR.

Witnesses for Richter:
  GEO. A. STEBBINS,
  F. E. KENNEDY.
Witnesses for Thos. L. Dunbar:
  WILLIS I. FLETCHER,
  GEORGE HARRIS.

Copies of this patent may be obtained for five cents each, by addressing the "Commissioner of Patents, Washington, D. C."